United States Patent
Fu et al.

(10) Patent No.: US 10,462,634 B2
(45) Date of Patent: Oct. 29, 2019

(54) METHOD FOR BLUETOOTH MODE SWITCHING, BLUETOOTH SYSTEM AND ELECTRONIC DEVICE

(71) Applicant: SMARTECH WORLDWIDE LIMITED, Tortola (VG)

(72) Inventors: Yunhe Fu, Shenzhen (CN); Martin Yeung-Kei Chui, Hong Kong (CN); Mid Wang, Hong Kong (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 0 days.

(21) Appl. No.: 15/846,262

(22) Filed: Dec. 19, 2017

(65) Prior Publication Data

US 2018/0176717 A1   Jun. 21, 2018

(30) Foreign Application Priority Data

Dec. 20, 2016   (CN) .......................... 2016 1 1182691

(51) Int. Cl.
  *H04W 4/80* (2018.01)
  *H04L 12/26* (2006.01)

(52) U.S. Cl.
  CPC .............. *H04W 4/80* (2018.02); *H04L 43/04* (2013.01); *H04L 43/0829* (2013.01)

(58) Field of Classification Search
  CPC ....... H04W 4/80; H04L 43/0829; H04L 43/04
  See application file for complete search history.

(56) References Cited

U.S. PATENT DOCUMENTS

| | | | |
|---|---|---|---|
| 2004/0037257 A1* | 2/2004 | Ngo | H04L 1/0003 370/338 |
| 2012/0058727 A1 | 3/2012 | Cook et al. | |
| 2013/0316642 A1* | 11/2013 | Newham | H04W 52/0206 455/11.1 |
| 2017/0135009 A1* | 5/2017 | Ling | H04L 12/4633 |
| 2018/0146478 A1* | 5/2018 | Kim | H04W 76/14 |

FOREIGN PATENT DOCUMENTS

| | | |
|---|---|---|
| CN | 104335642 A | 2/2015 |
| CN | 105284134 A | 1/2016 |
| CN | 105812906 A | 7/2016 |
| CN | 105848225 A | 8/2016 |

* cited by examiner

*Primary Examiner* — Hashim S Bhatti
*Assistant Examiner* — Abdullahi Ahmed
(74) *Attorney, Agent, or Firm* — IPro, PLLC; Na Xu

(57) ABSTRACT

A method for Bluetooth mode switching, a Bluetooth system and an electronic device are disclosed. The module includes: in a data listen mode, determining, according to transmission of data packets, whether a predetermined switching condition is satisfied, wherein the data listen mode is a working mode that allows unidirectional acquisition of data packets delivered by a data source device in a Bluetooth communication process; and if the predetermined switching condition is satisfied, requesting to establish Bluetooth communication with the data source device, and switching to a Bluetooth communication mode.

6 Claims, 4 Drawing Sheets

- 201

In a data listen mode, whether a predetermined switching condition is satisfied is determined according to transmission of data packets

- 202

If the predetermined switching condition is satisfied, it is requested to establish Bluetooth communication with the data source device, and switches to the Bluetooth communication mode

METHOD FOR BLUETOOTH MODE SWITCHING, BLUETOOTH SYSTEM AND ELECTRONIC DEVICE

CROSS-REFERENCE TO RELATED APPLICATIONS

The present disclosure claims priority to Chinese Patent Application No. 201611182691.7, filed with the Chinese Patent Office on Dec. 20, 2016, titled "METHOD AND APPARATUS FOR BLUETOOTH MODE SWITCHING BLUETOOTH SYSTEM AND METHOD FOR STEREO AUDIO TRANSMISSION BASED A2DP", the entire contents of which are incorporated herein by reference.

TECHNICAL FIELD

The present disclosure relates to the technical field of Bluetooth, and in particular, relates to a method for Bluetooth mode switching, a Bluetooth system and an electronic device.

BACKGROUND

Various types of wireless transmission devices, for example, smart phones, Bluetooth headphones, MP3 players and the like, have been extensively applied. Most wireless transmission devices support Bluetooth transmission of audios and other types of data. In the Bluetooth protocol (A2DP profile), one data output source (for example, a smart phone, an MP3 player or the like) may be only connected to one audio playback device, and transmit data via Bluetooth to an audio playback device for playback.

In some scenarios, the data output source needs to transmit data to two or more than two audio playback devices. For example, the stereo headphone requires that left and right-channel playback devices are both wirelessly connected to the data output source. In case of data reception, the playback device in one channel (for example, the left headphone) only acts as a primary device to receive the data transmitted by the data output source based on a Bluetooth communication mode. Then the data is transmitted to the playback device in the other channel (that is, acting as a secondary device) via Bluetooth or other non-Bluetooth transmission protocols.

SUMMARY

An embodiment of the present disclosure provides a method for Bluetooth mode switching. The method includes:
  in a data listen mode, determining, according to transmission of data packets, a predetermined switching condition is satisfied, wherein the data listen mode is a working mode that allows unidirectional acquisition of data packets delivered by a data source device in a Bluetooth communication process; and
  if the predetermined switching condition is satisfied, requesting to establish Bluetooth communication with the data source device, and switching to a Bluetooth communication mode.

Another embodiment of the present disclosure provides an electronic device. The electronic device includes:
  a memory, a communication module and a processor coupled to the memory and the communication module;
  the memory storing instructions that are executable by the processor; wherein execution of the instructions by the processor causes the processor via the communication module to:
  in a data listen mode, determine, according to transmission of data packets, a predetermined switching condition is satisfied, wherein the data listen mode is a working mode that allows unidirectional acquisition of data packets delivered by a data source device in a Bluetooth communication process; and
  if the predetermined switching condition is satisfied, request to establish Bluetooth communication with the data source device, and switch to a Bluetooth communication mode.

Still another embodiment of the present disclosure provides a Bluetooth system. The Bluetooth system includes: a data source device configured to provide data, and a first device and at least one second device configured to establish Bluetooth communication with the data source device, at least one communication connection channel being established between the second device and the first device; wherein
  the second device is configured to, in a data listen mode, determine, according to transmission of data packets, a predetermined switching condition is satisfied, wherein the data listen mode is a working mode that allows unidirectional acquisition of data packets delivered by a data source device in a Bluetooth communication process; and
  if the predetermined switching condition is satisfied, the second device is configured to request to establish Bluetooth communication with the data source device, and switch to a Bluetooth communication mode; and the first device switches to the data listen mode.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present disclosure instead of limiting the present disclosure.

In Bluetooth, a Bluetooth device does not need to fulfill all the Bluetooth specifications. For compatibility between different Bluetooth devices, some application layer-specific protocols are defined in the Bluetooth specifications, and these protocols are used to define how to implement a connection or application between the Bluetooth devices.

The Advanced Audio Distribution Profile (A2DP) is a subset in the above described Bluetooth profiles. The A2DP is dedicated to transfer of stereo music via the Bluetooth. In a case where two Bluetooth devices both support the profiles, the stereo music may be transferred via the Bluetooth. In A2DP, a data source device acting as an audio data output terminal is only allowed to establish a Bluetooth communication connection with one Bluetooth device, and transmit data therebetween. Other Bluetooth devices may acquire audio data output by the data source device via other different manners, and stereophonically plays the audio data.

In this embodiment, the term "data listen mode" refer to a working mode in which other Bluetooth devices acquire data output by the data source device. In A2DP, other Bluetooth devices are allowed to unidirectionally acquire data output by the data source device by means of data listen. Nevertheless, other Bluetooth devices have the capability to establish a Bluetooth connection with the data source device. When one Bluetooth device establishes a Bluetooth connection with the data source device, the remaining Bluetooth devices may acquire, by means of the "data listen mode", data (for example, stereo audio data) delivered by the data source device to the Bluetooth device that has established the Bluetooth connection therewith.

Figures 1, 2:
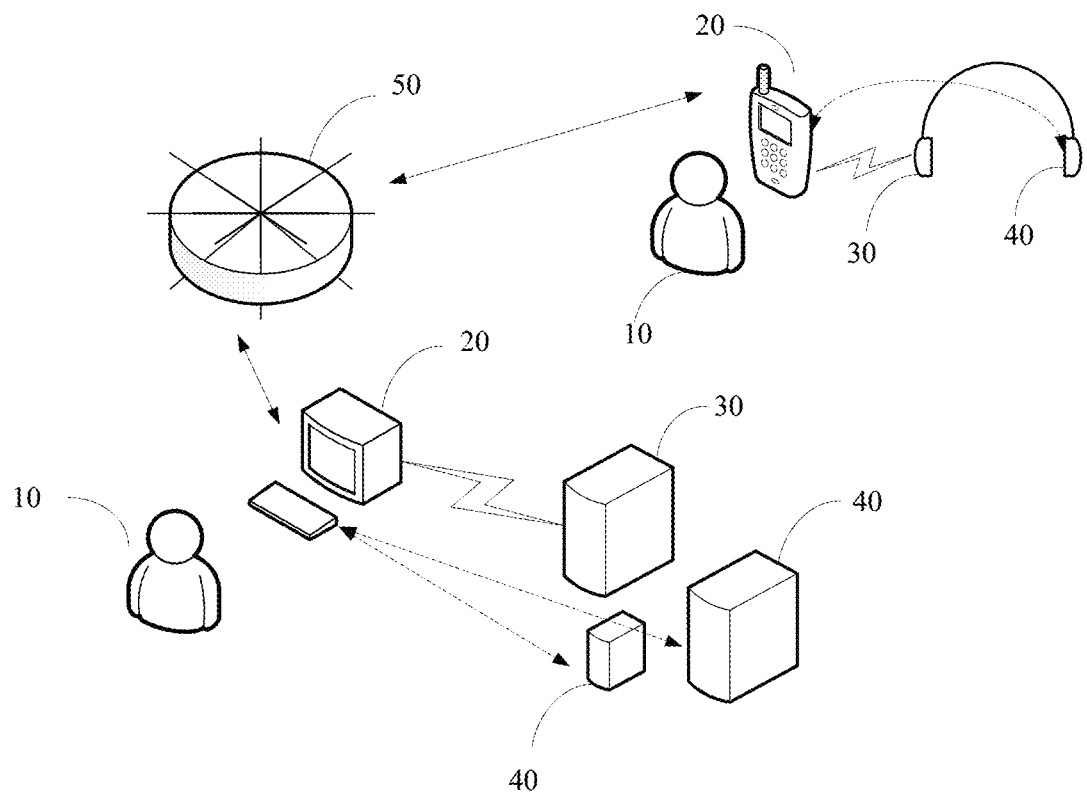
FIG. 1 is a schematic diagram of an application environment according to an embodiment of the present disclosure.
FIG. 2 is a flowchart of a method for Bluetooth mode switching according to an embodiment of the present disclosure.

FIG. 1 illustrates an environment where stereo music is transferred via the A2DP according to an embodiment of the present disclosure. As illustrated in FIG. 1, the application environment includes: a user 10, a data source output device 20, a multi-channel playback device (including a first audio playback device 30 and a second audio playback device 40), and a network 50.

The user 10 may be a group having the same or similar operation behaviors in any number, for example, a family, a work group or individuals. The user 10 may interact with the data source output device 20 and/or the multi-channel playback device by using one or a plurality of user interaction device of any suitable type, for example, a mouse, a keypad, a remote control, a touch screen, a motion sensing camera, or a smart wearable device, input instructions or control the data source output device 20 and/or the multi-channel playback device to perform one or a plurality of operations, for example, an audio playback operation.

The data source output device 20 may be a suitable electronic device that supports the A2DP and provides one or a plurality of audio contents, for example, a smart phone, a tablet computer, an MP3 player, a personal computer, a laptop computer, a personal audio device, a CD player, or any other smart/non-smart terminal device. The data source output device 20 is coupled to at least one storage medium configured to store audio data, and acquires the audio data. The data source output device 20 may also be a combination of one or a plurality of electronic devices, for example, a smart phone and a digital-to-analog converter (DAC) connected thereto.

The multi-channel playback device may include a first audio playback device 30 and a second audio playback device 40. The multi-channel playback device may be a suitable electronic device that supports the A2DP and is capable of playing audio data, for example, a stereo headphone, a 2.1 channel speaker, a 5.1 channel audio device, a stereo speaker or any other suitable speaker group. The first audio playback device 30 and the second audio playback device 40 are merely used to represent speaker parts that play audio data in different channels. For example, with respect to stereo audio data, the first audio playback device 30 may be a left-channel headphone, and the second audio playback device 40 is a right-channel headphone. Nevertheless, the first audio playback device 30 may also be a right-channel headphone, and the second audio playback device 40 may also be a left-channel headphone.

Both the first audio playback device 30 and the second audio playback device 40 are Bluetooth devices, and these two playback devices at least support two working modes, a "data listen mode" and a Bluetooth communication mode. According to actual needs, both of the two playback devices may work in the data listen mode or the Bluetooth communication mode.

The data source output device 20 may establish a Bluetooth connection with the multi-channel audio playback device according to a user instruction, and transfer audio data based on A2DP. In this embodiment, the data source output device 20 may establish a Bluetooth connection with the first audio playback device 30, and provide some related information.

The network 50 may be a suitable wired or wireless network that implements communication between two electronic devices, for example, the Internet, a local area network or a cabled network. The data source output device 20 has at least one network interface, establishes a communication connection with the network 50, and acquires corresponding audio data or instructions from the network 50. Nevertheless, the data source output device 20 may also have at least one local storage device, and acquire corresponding audio data from the local storage device.

In some other embodiments, some devices may be added or removed according to the actual needs. For example, the network 50 may be removed or an additional user interaction device may be added.

When the first audio playback device 30 works in the Bluetooth communication mode, the user 10 sends an instruction to the data source output device 20 (for example, a smart phone), and the data source output device 20 sends audio data to the first audio playback device 30 based on A2DP according to the related instruction.

In the process that the data source output device 20 sends the audio data, the second audio playback device 40 works in the data listen mode, and intercepts the sent audio data to acquire the audio data.

A communication channel (for example, a Bluetooth communication channel) may also be established between the first audio playback device 30 and the second audio playback device 40 for data transmission. In some embodiments, the first audio playback device 30 may also send some information desired by data listen to the second audio playback device 40 over the communication channel. For example, connection information related to the data source output device 20 may be transmitted from the first audio playback device 30 to the second audio playback device 40 via the Bluetooth communication.

The second audio playback device 40 may also know reception of the data delivered from the data source device by the first audio playback device 30. It may be understood that in a good communication condition, the first audio playback device 30 would provide integral and correct data packets. However, in some poor communication conditions, various errors may be caused depending on the actual conditions. In a poor communication condition, the second audio playback device 40 may proactively request to establish a connection with the data source device, and take the place of the first audio playback device to establish Bluetooth communication with the data source device and switches to the Bluetooth communication mode. Correspondingly, the first audio playback device enters the data listen mode to acquire data.

For brevity of description, the audio playback device that establishes the Bluetooth connection with the data source device and runs in the Bluetooth communication mode may be called as a primary device, and the remaining audio playback devices running in the data listen mode may be called as secondary devices. The first and second audio playback devices are both switchable between the Bluetooth communication mode and the data listen mode.

FIG. 1 only illustrates two users 10, two data source output devices 20, two first audio playback devices 30, and three second audio playback devices 40. However, a person skilled in the art should understand that in practical application, the environment may include more users 10, more data source output devices 20, more first audio playback devices 30 or more second audio playback devices 40.

In addition, the environment according to the embodiment as illustrated in FIG. 1 is described using A2DP-based Bluetooth audio transmission as an example. However, the Bluetooth communication method according to the embodiment of the present disclosure may also be applied to any suitable scenario where data needs to be transmitted from one data source output device to a plurality of different data receiving devices via Bluetooth transmission, but is not limited to application of stereo audio transmission based on A2DP.

FIG. 2 is a flowchart of a method for Bluetooth mode switching performed by a secondary device according to an embodiment of the present disclosure. In this embodiment, the first audio playback device 30 is a primary device in a stereo headphone whereas the second audio playback device 40 is a secondary device in the stereo headphone. As illustrated in FIG. 2, the method includes the following steps:

201: In a data listen mode, whether a predetermined switching condition is satisfied is determined according to transmission of data packets.

The data listen is a working mode that allows unidirectional acquisition of data packets delivered by the data source device in the Bluetooth communication process. Under the Bluetooth protocol, a plurality of different devices are allowed to acquire the data packets delivered by the data source device in the data listen mode, but are only allowed to unidirectional acquire the data packets.

The predetermined switching condition refers to a communication condition between the data source device and the Bluetooth devices. The switching condition may be specifically defined according to actual needs, and the communication condition may be expressed by one parameter value or a combination of a plurality of parameter values (for example, a packet loss ratio, a packet error ratio and the like).

The secondary device may determine the current communication condition according to transmission of the current data packets, and then compare the determined communication condition with the switching condition to make a judgment. The specific comparison manner and steps may depend on the expression of the communication condition by the predetermined switching condition.

202: If the predetermined switching condition is satisfied, switches to the Bluetooth communication mode by a request for establishing Bluetooth communication with the data source device.

If the predetermined switching condition is satisfied, the secondary device may consider that in this case the secondary device is in a better communication condition and may act as the primary device.

The Bluetooth communication mode is a working mode that allows data transmission between the data source output device 20 and the primary and secondary devices based on Bluetooth communication, and is a process of point-to-point data transmission based on A2DP.

In this embodiment, the secondary device may switch its role in the data transmission process according to variations of the communication condition. If the communication condition of the secondary device satisfies the predetermined condition, the secondary device may proactively adjust its role as the primary device, to prove quality of communication between the data source device and the audio playback device.

Figure 3:
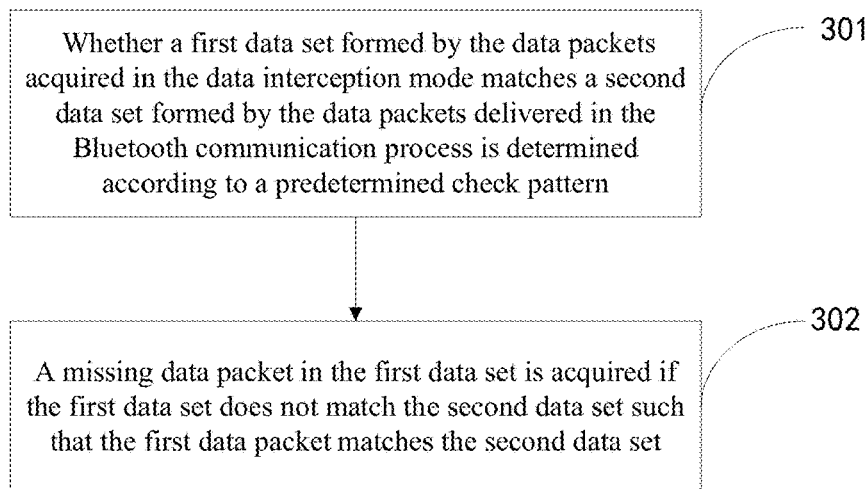
FIG. 3 is a flowchart of a method for Bluetooth mode switching according to another embodiment of the present disclosure.

FIG. 3 is a flowchart of a method for Bluetooth mode switching performed by a secondary device according to another embodiment of the present disclosure. In this embodiment, the secondary device may also be configured to perform the following steps:

301: Whether a first data set formed by the data packets acquired in the data listen mode matches a second data set formed by the data packets delivered in the Bluetooth communication process is determined according to a predetermined check pattern.

In some embodiments, whether the first data set matches the second data set may be specifically determined according to the checking method based on the contiguous data packet serial numbers. In some other embodiments, other identifiers suitable for the data packets may also be used to determine whether the first data set matches the second data set.

In the application environment as illustrated in FIG. 1, the data source output device may normally conduct Bluetooth communication with one of the audio playback devices (that is, the primary device). The primary device and the data source output device are in a standard Bluetooth communication, wherein the bidirectional communication is allowed, and different mechanisms are employed to ensure data integrity in the data transmission. Therefore, the second data set received by the primary device may be considered as the integral data.

302: A missing data packet in the first data set is acquired if the first data set does not match the second data set such that the first data packet matches the second data set.

If the first data set does not match the second data set, the secondary device may request the primary device to sent the different part (for example, the missing data packet) therebetween via the Bluetooth or other suitable communication modes, to ensure that the data packets received by the secondary device and the primary device are consistent.

As described above, relative to data transmission between the primary device and the data source output device 20 in the Bluetooth communication mode, the secondary device employs a unidirectional data transmission mode. That is, in the working mode of data listen, the secondary device only unidirectional acquires the data output by the data source output device 20 but fails to send feedback information indicative of data reception details thereof to the data source output device 20.

Therefore, the data listen mode is not a bidirectional communication process; and the audio playback device fails to provide data reception details to the data source playback device, and fails to ensure data integrity in the data transmission process by means of handshake, Bluetooth baseband processing or retransmission mechanism. Through the above checking steps and steps of acquiring the missing data packet, integrity of the data of the audio playback device may be ensured by making the first data set match the second data set.

In this embodiment, the data received by the secondary device is consistent with the data received by the primary device (the first data set and the second data set), such that the data acquired by the secondary device has better integrity. Compared with forwarding all the data by the primary device to the secondary device, in this embodiment, the different part between the first data set and the second data set only needs to be forwarded. In this way, data needs to be forwarded is greatly reduced, and thus the data transmission load and the occupied data bandwidth are better reduced.

Figure 4:
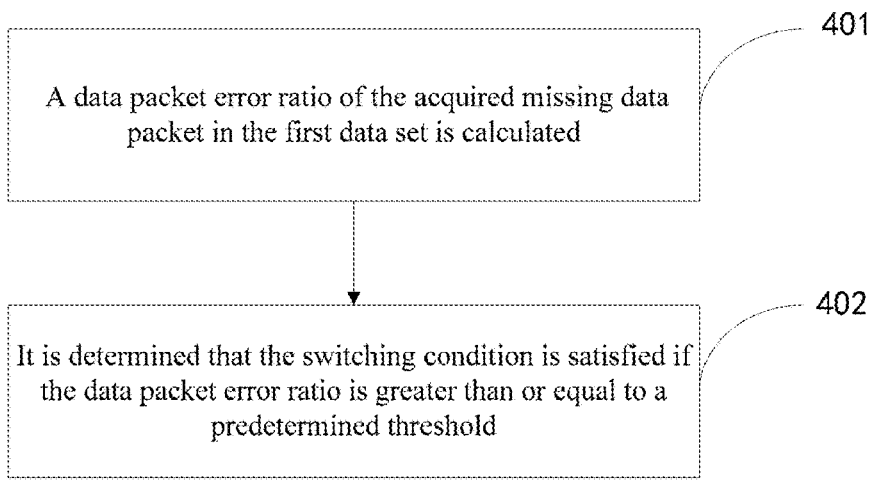
FIG. 4 is a flowchart of step 201 of the method of FIG. 3 according to an embodiment of the present disclosure.

In this embodiment, a communication connection is established between the secondary device and the primary device, and the secondary device may acquire data from the primary device based on Bluetooth or a suitable manner. For example, a data packet missed in the first data set may be acquired. Therefore, the secondary device may determine whether the predetermined switching condition is satisfied based on the manner as illustrated in FIG. 4.

401: A data packet error ratio of the acquired missing data packet in the first data set is calculated. In the data packets sent by the data source device, whether data received by the device is correct is determined by generally using some types of check bits. The secondary device may check whether the data packets are correct and calculate a ratio of erroneous data packets in the data packets received by the secondary device.

402: It is determined that the switching condition is satisfied if the data packet error ratio is greater than or equal to a predetermined threshold.

When the data packets received by the secondary device from the primary device are always erroneous, that is, when the date packet error ratio is high, it may be considered that in this case the communication condition of the primary device is poor, especially when the data packet error ratio acquired by the secondary device from the data source device in the data listen mode is low.

Specifically, one or a plurality of predetermined threshold may be defined according to the secondary device actually used or other actual conditions. If the data packet error ratio satisfies the predetermined threshold, the communication condition between the secondary device and the data source device is better than the communication condition between the primary device and the data source device.

In this case, it may be determined that the predetermined switching condition is satisfied, and the secondary device may request to establish a Bluetooth connection with the data source device and to act as the primary device, so as to ensure quality of data transmission.

In some other embodiments, the number of acquired data packets may also be used as a standard for measuring the communication quality. Based the communication connection between the secondary device and the primary device, the second device may perform the method as illustrated in FIG. 5, measure the communication quality of the primary device and determine whether the predetermined switching condition is satisfied.

Figure 5:
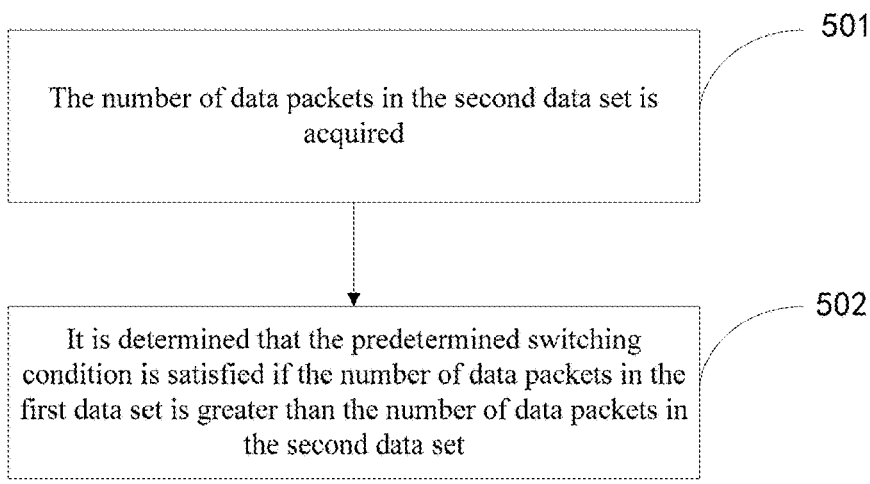
FIG. 5 is a flowchart of step 201 of the method of FIG. 3 according to another embodiment of the present disclosure.

As illustrated in FIG. 5, the method includes the following steps:

501: The number of data packets in the second data set is acquired.

Within a time segment, the number of data packets delivered by the data source device is stable. When the primary device is in a normal or suitable communication condition, all or the majority of the data packets may be acquired (based on the handshake protocol or the like). The secondary device may acquire the information of the data packet reception condition of the primary device based on the communication connection (for example, the Bluetooth connection) between the secondary device and the primary device.

502: It is determined that the predetermined switching condition is satisfied if the number of data packets in the first data set is greater than the number of data packets in the second data set.

As described above, the integrity of the data acquired by the secondary device working in the data listen mode is generally poorer than that of the primary device. However, if the communication condition is subjected to exceptions or variations, the primary device may generally lose more data packets. That is, the number of data packets in the second data set is greatly reduced.

Therefore, the secondary device may determine, according to whether the primary device is subjected to such a case, whether the communication quality of the primary device is good or poor, so as to determine whether the predetermined switching condition is satisfied and perform the operations for switching the Bluetooth mode (that is, the roles of the secondary device and the primary device are exchanged).

In some other embodiments, some other suitable adjustment parameters may be added to step 502 such that the determination course is more accurate. For example, an additional parameter k may be defined, and it is determined that the predetermined switching condition is satisfied as long as a difference between the number of data packets in the second data set and the number of data packets in the first data set is greater than the parameter k.

It should be noted that the methods as illustrated in FIG. 4 and FIG. 5 may be incorporated for use in measuring the communication quality between the primary device and the data source device. A person skilled in the art would also use other suitable manners, employ one or a plurality of parameters or a combination of the parameters to measure the communication quality between the primary device and the data source device.

Figure 6:
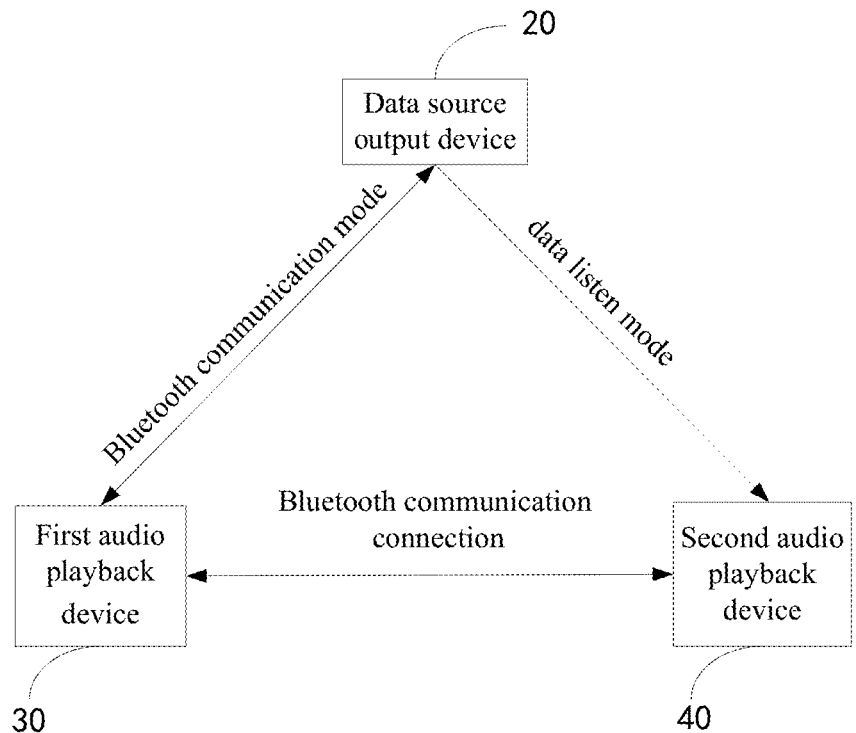
FIG. 6 is a structural block diagram of a Bluetooth system before mode switching according to an embodiment of the present disclosure.

FIG. 6 is a structural block diagram of a Bluetooth communication system according to an embodiment of the present disclosure. A secondary device in the Bluetooth communication system performs the Bluetooth mode switching method to ensure high quality of Bluetooth communication. As illustrated in FIG. 6, the Bluetooth communication system includes: a data source device 20, a first audio playback device 30, and a second audio playback device 40.

The first audio playback device 30 works in a Bluetooth communication mode, and establishes a Bluetooth communication connection with the data source device 20 to acquire audio data delivered by the data source device 20. The second audio playback device 40 works in a data listen mode. A Bluetooth communication connection is established between the first audio playback device 30 and the second audio playback device 40, and the second audio playback device 40 may acquire details of data packet transmission of the first audio playback device 30.

In the data listen mode, the second audio playback device 40 measures communication quality between the first audio playback device 30 and the data source device 29 based on data packet transmission.

Figure 7:
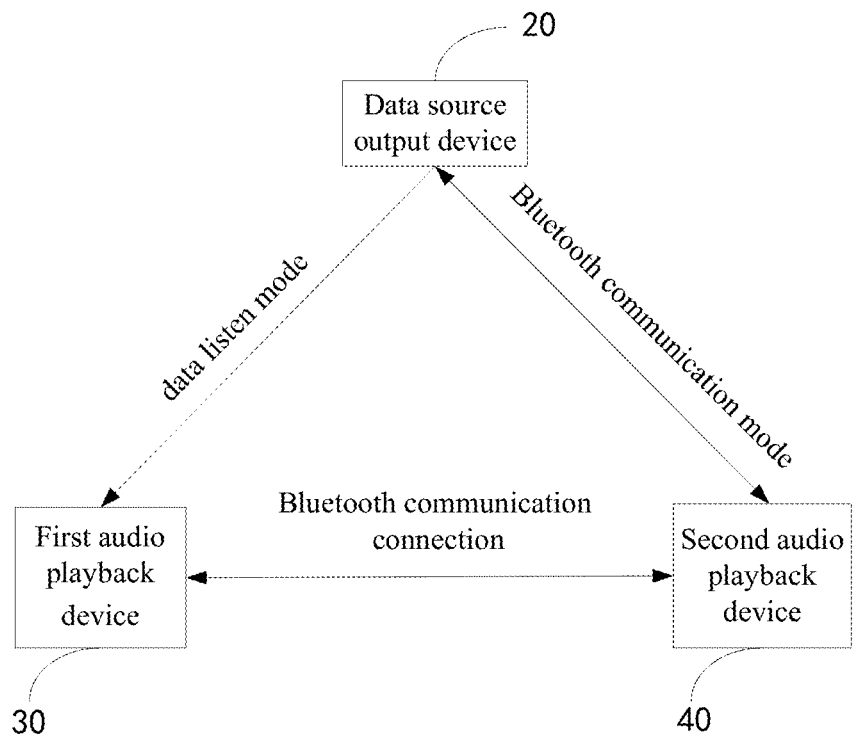
FIG. 7 is a structural block diagram of a Bluetooth system after mode switching according to an embodiment of the present disclosure.

As illustrated in FIG. 7, when the predetermined switching condition is satisfied, the second audio playback device 40 request to establish Bluetooth communication with the data source device 20, and to switch to the Bluetooth communication mode.

The data source device 20 only supports one-to-one Bluetooth connection. Therefore, the first audio playback device 20 cuts off the connection with the data source device 20, and switches to the data listen mode.

The above process is a continuous course. That is, the first audio playback device 20 switching to the data listen mode may also re-establish a Bluetooth connection with the data source device 20 and re-act as the primary device if the predetermined switching condition is satisfied, thereby implementing an exchange of roles of the devices.

In the Bluetooth communication system according to this embodiment, through the exchange of the roles of the devices, the audio playback device acting as the primary device may be dynamically adjusted, such that the device in a good communication condition acts as the role of the primary device, thereby ensuring good transmission quality of the data source device.

Figure 8:
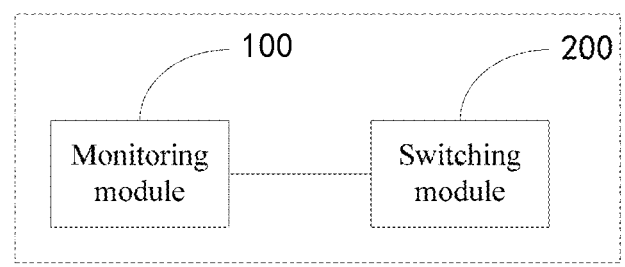
FIG. 8 is a functional block diagram of an apparatus for Bluetooth mode switching according to an embodiment of the present disclosure.
Figure 9:
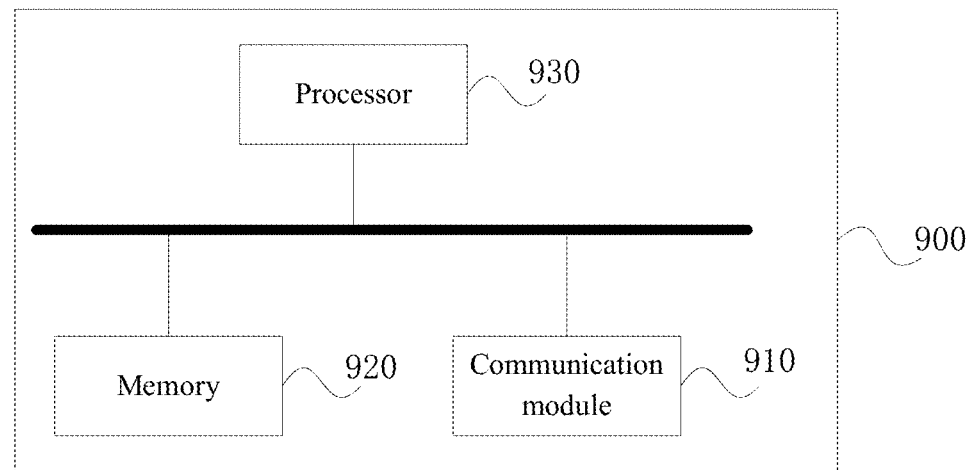
FIG. 9 is a schematic structural diagram of an electronic device according to an embodiment of the present disclosure.

The present disclosure further provides a Bluetooth mode switching apparatus corresponding to the above method embodiments. FIG. 5 is a functional block diagram of a Bluetooth mode switching apparatus according to an embodiment of the present disclosure. As illustrated in FIG. 8, the apparatus includes: a monitoring module and a switching module 200.

The monitoring module 100 is configured to, in a data listen mode, determine, according to transmission of data packets, a predetermined switching condition is satisfied, wherein the data listen mode is a working mode that allows unidirectional acquisition of data packets delivered by a data source device in a Bluetooth communication process. The switching module 200 is configured to, if the predetermined switching condition is satisfied, request to establish Bluetooth communication with the data source device, and switch to a Bluetooth communication mode.

Through switching of the working mode of the secondary device, the audio playback device acting the role of the primary device may be dynamically adjusted, to ensure the communication quality of the primary device.

In the Bluetooth mode switching apparatus according to another embodiment of the present disclosure, the monitoring module 100 is further configured to: determine, according to a predetermined check pattern, whether a first data set formed by the data packets acquired in the data listen mode matches a second data set formed by the data packets delivered in the Bluetooth communication process; and acquire a missing data packet in the first data set if the first data set does not match the second data set such that the first data set matches the second data set.

In this embodiment, based on the communication connection between the primary device and the secondary device, to measure the communication quality between the primary device and the data source device, the monitoring module 100 is specifically configured to: calculate a data packet error ratio of the acquired missing data packet in the first data set; and determine that the switching condition is satisfied if the data packet error ratio is greater than or equal to a predetermined threshold.

In some other embodiments, the monitoring module 100 is specifically configured to: acquire the number of data packets in the second data set; and determine that the predetermined switching condition is satisfied if the number of data packets in the first data set is greater than the number of data packets in the second data set.

The above measurement methods based on data packet error ratio and number of data packets may be incorporated for use in practice. A person skilled in the art would also add or delete other suitable measurement parameters according to actual needs.

It should be noted that since the apparatus embodiments and the method embodiments are based on the same inventive concept, and technical contents in the method embodiments may also be applied to the apparatus embodiments, which are thus not described herein any further.

A personnel skilled in the art should be further aware that with reference to the embodiments of the present application disclosed herein, various exemplary Bluetooth communication steps may be implemented in the form of electronic hardware, computer software or a combination thereof. To clearly describe interchangeability between the hardware and software, the above description has generally illustrates the compositions and steps of the various example according to the functions. Whether such functions are implemented in the form of software or hardware depends on the specific application and the design restrictions applied to the entire system.

A personnel skilled in the art may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

An embodiment of the present disclosure further provides an electronic device 900. The electronic device 900 includes: a communication module 910, a memory 920, and a processor 930 coupled to the communication module 910 and the memory 920.

The memory 920 stores instructions that are executable by the processor 930, and the processor 930 executes the instructions to cause the processor 930 to perform the steps in the above embodiments of the method of FIG. 2 via the communication module 910: in a data listen mode, determine, according to transmission of data packets, a predetermined switching condition is satisfied, wherein the data listen mode is a working mode that allows unidirectional acquisition of data packets delivered by a data source device in a Bluetooth communication process; if the predetermined switching condition is satisfied, it is request to establish Bluetooth communication with the data source device, and switch to a Bluetooth communication mode.

The electronic device 900 may the first audio playback device 30 or the second audio playback devices 40 in the application environment as illustrated in FIG. 1, for example, a 2.1 channel audio device, a stereo headphone or other multi-channel audio playback devices. The electronic device 900 supports two working modes, which may either act as the primary device and works in the Bluetooth communication mode, or act as the secondary device and works in the data listen mode.

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for Bluetooth mode switching, comprising:
   in a data listen mode, determining that a predetermined switching condition is satisfied if the number of data packets in a first data set is greater than the number of data packets in a second data set, wherein the data listen mode is a working mode that allows unidirectional acquisition of data packets delivered by a data source device in a Bluetooth communication process, and
   if the predetermined switching condition is satisfied, requesting to establish Bluetooth communication with the data source device, and switching to a Bluetooth communication mode, wherein the first data set is formed by the data packets acquired in the data listen mode, and the second data set is formed by the data packets delivered in a second Bluetooth communication process.

2. The method according to claim 1, wherein in the data listen mode, the method further comprises:
   determining, according to a predetermined check pattern, whether the first data set formed by the data packets acquired in the data listen mode matches the second data set formed by the data packets delivered in the second Bluetooth communication process; and
   acquiring a missing data packet in the first data set, if the first data set does not match the second data set, in order to match the first data set with the second data set.

3. An electronic device, comprising:
   a memory, a communication module and a processor coupled to the memory and the communication module;
   the memory storing instructions that are executable by the processor; wherein execution of the instructions by the processor causes the processor via the communication module to:
   in a data listen mode, determining that a predetermined switching condition is satisfied if the number of data packets in a first data set is greater than the number of data packets in a second data set, wherein the data listen mode is a working mode that allows unidirectional acquisition of data packets delivered by a data source device in a Bluetooth communication process, and
   if the predetermined switching condition is satisfied, requesting to establish Bluetooth communication with the data source device, and switching to a Bluetooth communication mode, wherein the first data set is formed by the data packets acquired in the data listen mode, and the second data set is formed by the data packets delivered in a second Bluetooth communication process.

4. The electronic device according to claim 3, wherein the execution of the instructions by the processor further causes the processor to:
   determining, according to a predetermined check pattern, whether the first data set formed by the data packets acquired in the data listen mode matches the second data set formed by the data packets delivered in the second Bluetooth communication process; and
   acquiring a missing data packet in the first data set, if the first data set does not match the second data set, in order to match the first data set with the second data set.

5. A Bluetooth system, comprising: a data source device configured to provide data, a first device, and at least one second device configured to establish Bluetooth communication with the data source device, at least one communication connection channel being established between the second device and the first device; wherein
   the second device is configured to, in a data listen mode, determine that a predetermined switching condition is satisfied if the number of data packets in a first data set is greater than the number of data packets in a second data set, wherein the data listen mode is a working mode that allows unidirectional acquisition of data packets delivered by a data source device in a Bluetooth communication process, the first data set is formed by the data packets acquired in the data listen mode and the second data set is formed by the data packets delivered in a second Bluetooth communication process; and
   if the predetermined switching condition is satisfied, the second device is configured to request to establish Bluetooth communication with the data source device, and switch to a Bluetooth communication mode; and
   the first device switches to the data listen mode.

6. The Bluetooth system according to claim 5, wherein the second device is further configured to, in the data listen mode, determine, according to a predetermined check pattern, whether the first data set formed by the data packets acquired in the data listen mode matches the second data set formed by the data packets delivered in the Bluetooth communication process; and
   acquire a missing data packet in the first data set, if the first data set does not match the second data set, in order to match the first data set with the second data set.

* * * * *